(12) United States Patent
Salort et al.

(10) Patent No.: US 10,584,220 B2
(45) Date of Patent: Mar. 10, 2020

(54) MODIFIED POLYMERS AND STABLE EMULSIONS COMPRISING THE SAME

(71) Applicant: Fina Technology, Inc., Houston, TX (US)

(72) Inventors: Fabien Salort, Balagny sur Therain (FR); Jean-Marc Monsallier, Longueau (FR)

(73) Assignee: Fina Technology, Inc., Houston, TX (US)

( * ) Notice: Subject to any disclaimer, the term of this patent is extended or adjusted under 35 U.S.C. 154(b) by 547 days.

(21) Appl. No.: 15/054,431

(22) Filed: Feb. 26, 2016

(65) Prior Publication Data

US 2017/0247517 A1    Aug. 31, 2017

(51) Int. Cl.
*B32B 1/08* (2006.01)
*C08J 5/06* (2006.01)
(Continued)

(52) U.S. Cl.
CPC ............. *C08J 5/06* (2013.01); *C08F 36/06* (2013.01); *C08J 3/05* (2013.01); *D06M 15/227* (2013.01);
(Continued)

(58) Field of Classification Search
CPC ........ C08G 18/69; C08G 18/00; C08G 18/04; C08G 18/06; C08G 18/10; C08G 18/17; C08G 18/32; C08G 18/3203; C08G 18/3206; C08G 18/40; C08G 18/62; C08G 18/6204; C08G 18/6208; C08G 18/67
See application file for complete search history.

(56) References Cited

U.S. PATENT DOCUMENTS 4,234,714 A * 11/1980 Earing .................. C08G 18/69
528/59
5,672,653 A * 9/1997 Frisch ................ C08G 18/0823
264/204
(Continued)

FOREIGN PATENT DOCUMENTS

CN        101003945 A *  7/2007
EP        0896971 A1     2/1999
(Continued)

OTHER PUBLICATIONS

Machine Translation of CN-101003945 (Year: 2007).*
(Continued)

*Primary Examiner* — Prashant J Khatri
*Assistant Examiner* — Zachary M Davis
(74) *Attorney, Agent, or Firm* — Albert Shung

(57) ABSTRACT

A modified polymer includes a diene-based polymeric chain and at least one end terminated with a blocked isocyanate group. The blocked isocyanate group may be the reaction product of an isocyanate and a blocking agent, and the blocking agent is selected, such that the modified polymer deblocks at temperatures of at least 100 C. An aqueous emulsion of the modified polymer may be provided that may be surfactant-free. The emulsion may be combined with one or more latexes to provide a treatment solution for a fabric or fiber that does not require the use of resorcinol and formaldehyde. Once treated and dried, the fabric or fiber may be used to impart tensile strength to rubber products, such as tires, air springs, flexible couplings, power transmission belts, conveyor belts, and fluid routing hoses.

18 Claims, 1 Drawing Sheet

(51) Int. Cl.
*C08F 36/06* (2006.01)
*C08J 3/05* (2006.01)
*D06M 15/227* (2006.01)
*D06M 15/356* (2006.01)
*D06M 101/06* (2006.01)
*D06M 101/20* (2006.01)
*D06M 101/34* (2006.01)
*D06M 101/36* (2006.01)

(52) U.S. Cl.
CPC ...... *D06M 15/3562* (2013.01); *C08J 2307/00* (2013.01); *C08J 2347/00* (2013.01); *C08J 2401/02* (2013.01); *C08J 2423/06* (2013.01); *C08J 2439/08* (2013.01); *C08J 2447/00* (2013.01); *C08J 2477/00* (2013.01); *D06M 2101/06* (2013.01); *D06M 2101/20* (2013.01); *D06M 2101/34* (2013.01); *D06M 2101/36* (2013.01)

(56) References Cited

U.S. PATENT DOCUMENTS

| | | | | |
|---|---|---|---|---|
| 6,429,254 | B2* | 8/2002 | Schafheutle | C08G 18/0823 524/589 |
| 6,607,828 | B1 | 8/2003 | Hasaka | |
| 7,824,284 | B2 | 11/2010 | Burlett | |
| 2009/0056849 | A1* | 3/2009 | Imaoka | B60C 9/0042 152/451 |
| 2010/0324214 | A1 | 12/2010 | Doerr et al. | |
| 2012/0041113 | A1* | 2/2012 | Ikeda | C08G 18/58 524/114 |
| 2014/0093729 | A1* | 4/2014 | Furusawa | C08K 3/04 428/367 |

FOREIGN PATENT DOCUMENTS

| | | |
|---|---|---|
| EP | 1854917 A1 | 11/2007 |
| GB | 2002390 A | 2/1979 |
| JP | 01-207373 | 8/1989 |

OTHER PUBLICATIONS

Gündüz et al., Progress in Organic Coatings, 49:259-269 (2004).
International Search Report and Written Opinion for International Application No. PCT/US2017/018799, dated May 19, 2017, 13 pages.
International Preliminary Report on Patentability and Written Opinion for International Application No. PCT/US2017/018799, dated Aug. 28, 2018, 9 pages.

* cited by examiner

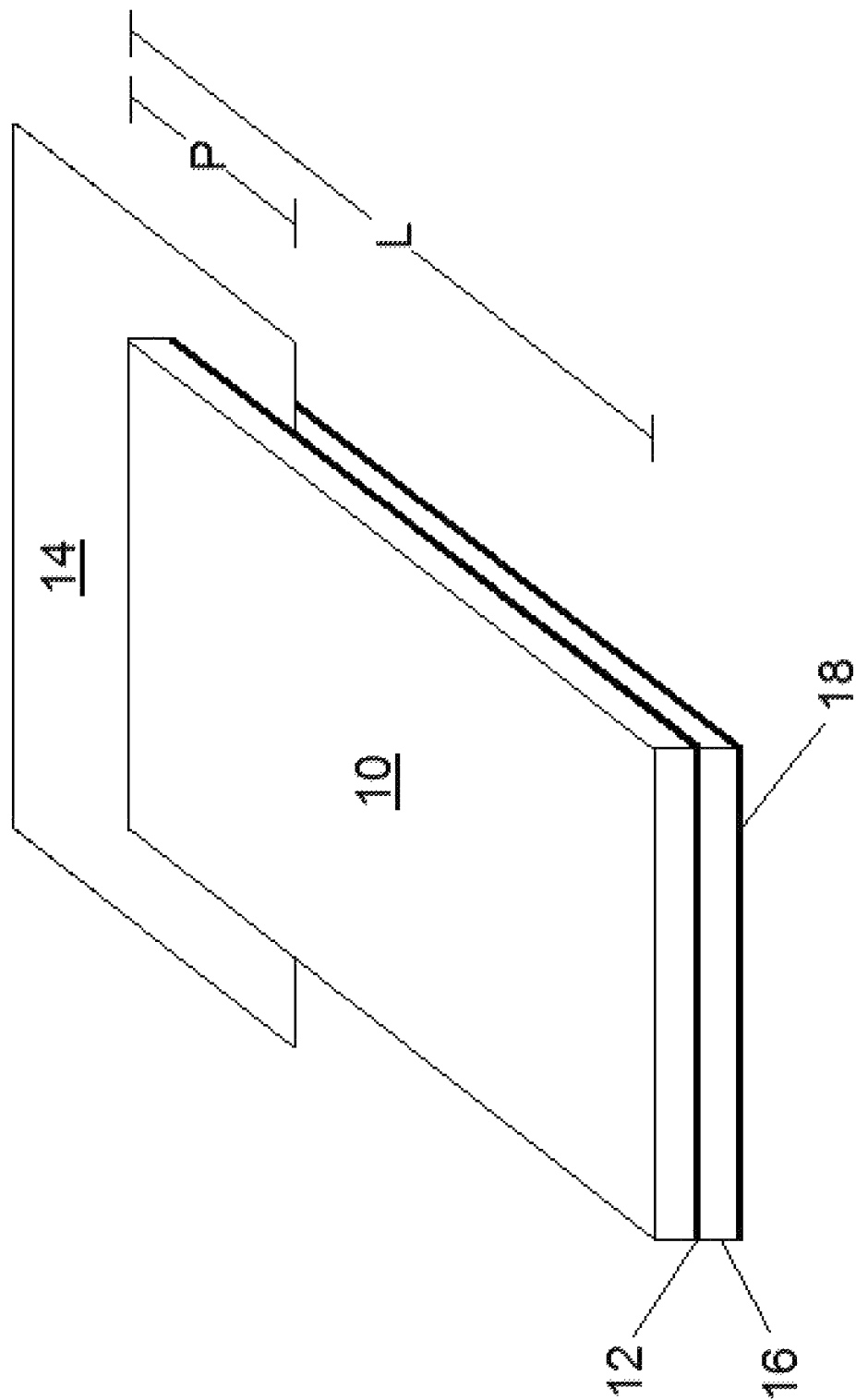

MODIFIED POLYMERS AND STABLE EMULSIONS COMPRISING THE SAME

FIELD OF THE INVENTION

The Invention relates to the treatment of fabric or fibrous products, such as woven and non-woven materials or cords, that are embedded in elastomeric products.

BACKGROUND OF THE INVENTION

Elastomeric products, such as power transmission belts, tires, couplings, and hoses, typically include fabrics or cords, embedded within one or more synthetic or natural elastomers. The fabrics and fibers may also be made of a synthetic or natural material and are incorporated in the elastomeric products to improve resiliency and tensile strength of the elastomeric products. During use, the elastomeric products, such as power transmission belts and tires, may be subjected to high loads. Thus, the fabrics or fibers are able to preserve the integrity of the elastomeric products and avoid failure during use.

Proper functioning of the elastomeric products relies on the adhesion between the fabrics or fibers and the elastomer in which they are embedded. Repetitive flexing may cause the fabrics or fibers to separate from the elastomer in which they are embedded resulting in product failure. Therefore, the fabrics or fibers are not merely embedded, but pre-treated, so that the fabrics or fibers will adhere to the elastomer and reduce the probability of separating from the elastomer during use. The known pre-treatment steps to promote adhesion between the fabrics or fibers include multiple steps to coat the fibers in a layer that is compatible with and will adhere to the elastomer used to form the elastomeric product.

For example, a conventional treatment for polyester cord consists of three coatings:
- a primer-treatment of Isocyanate or epoxy in organic solvent;
- a resorcinol-formaldehyde latex (RFL) treatment; and
- an optional overcoat adhesive based on a complex blend of polymers, curative cross-linkers, adhesion promoters, film formers and/or acid scavengers.

This is a complex series of treatments that are expensive, involve some environmentally unfriendly components, and require optimization for best performance.

Thus, there is a need for improved treatment compositions intended for fabrics or fibers incorporated in elastomeric products.

SUMMARY OF THE INVENTION

In one aspect, a modified polymer is provided comprising a diene-based polymeric chain and at least one end, or alternatively two or more ends, terminated with a blocked isocyanate group. The blocked isocyanate group may be the reaction product of an isocyanate and a blocking agent, and the blocking agent is selected, such that the modified polymer deblocks at temperatures of at least 100 C. For example, the blocking agent may be selected from the group consisting of caprolactams, phenols, oximes, pyrazoles, malonates, and combinations thereof. The diene based polymeric chain may be a product of copolymerizing one or more dienes, such as butadiene, with one or more co-monomers, such as vinyl aromatic monomers. The modified polymer may further comprises one or more acid functional groups and have a number average molecular weight of 1000 to 15000.

In another aspect, an aqueous emulsion of a modified polymer, as described above, is provided. The emulsion may have a solid content of 1% to 50% based on the weight of the emulsion. The emulsion may further comprise a base, such as an amine (e.g. triethylamine).

In yet another aspect, a method of preparing an emulsion is provided comprising:
  combining a hydroxyl-terminated polymer, such as a polyol of polybutadiene, an acid having at least two hydroxyl groups, a base, and a diisocyanate, such as Isophorone diisocyanate, in an organic solvent to form an isocyanate-terminated polymer reagent mixture;
  adding a blocking agent, such as cyclohexanone oxime, to the isocyanate-terminated polymer to form a blocked isocyanate terminated modified polymer;
  combining the modified blocked isocyanate terminated polymer with water; and
  removing the organic solvent,
wherein the blocked isocyanate terminated polymer deblocks at temperatures of at least 100 C. The emulsion may be further combined with one or more latexes, such as vinyl-pyridine latex, styrene-butadiene-rubber latex, carboxylated styrene butadiene rubber latex, and mixtures thereof.

In yet another aspect, a method of preparing a treated fabric or fiber is provided that includes:
  coating a fiber with a mixture comprising the aqueous emulsion described above and a latex, and
  drying the coated fiber to remove at least a portion of the water.

The fabric or fiber may comprise a natural or synthetic material fiber comprising at least one selected from the group consisting of cellulose, nylon, polyethylene, polyester, rayon, nylon, vinyl, polyamide, polyketone, poly-p-phenylene-benzobisoxazole ("PBO"), aramid, and carbon fibers, and combinations thereof. The resulting treated material may comprise at least one of a fabric and a fiber, the modified polymer, as described above, and one or more latexes. The modified polymer and one or more latexes may comprise 1 to 60 wt % of the treated material.

In yet another aspect, a rubber product is provided comprising an elastomeric material and the treated fabric or fiber as described above. The rubber product may be in the form of at least one of a tire, air spring, flexible coupling, power transmission belt, conveyor belt, fluid routing hose.

BRIEF DESCRIPTION OF THE FIGURE

FIG. 1 is a schematic top view of a sample of a layered structure containing a treated textile made according to one of the disclosed methods.

DETAILED DESCRIPTION OF THE INVENTION

It is an aspect of the disclosed methods and compositions to provide a fabric or fiber that may be pre-treated with a stable aqueous emulsion that consists essentially of a blocked isocyanate terminated polymer and latex, and excludes the use of resorcinol and formaldehyde to treat the fabric or fiber. Excluding resorcinol and formaldehyde results in a more environmentally friendly pre-treatment process. The treated fabrics or fibers may be suitable for use in an elastomeric product, such as power transmission belts, tires, couples, and hoses, for example, to enhance the tensile strength of the elastomeric product. In another aspect of the disclosed methods and compositions, pre-treatment processes are provided that require less process steps. It is a further aspect of the disclosed methods and compositions to provide a stable aqueous emulsion of the aforesaid polymer that does not require the use of a surfactant. Therefore, pre-treatment emulsions according to various embodiments of the disclosed methods and compositions are essentially surfactant-free.

The pre-treatment solutions and methods of providing pre-treated fabrics or fibers according to the various embodiments of the disclosed methods and compositions provide improved solutions and processes for the bonding of synthetic or natural elastomers to fabrics or fibers compared to previously utilized solutions and processes. Examples of elastomers in which the pre-treated fabrics or fibers may be incorporated, for example by embedding fiber cords into the elastomers, include all classes of synthetic and natural rubbers, polybutadiene, polyisoprene, poly(styrene-co-butadiene), poly(isoprene-co-butadiene), poly(butadiene-co-isoprene-co-styrene), butyl rubber, and ethylene-propylene-diene monomer rubber, such as ethylene propylene diene terpolymers (EPDM), ethylene octene copolymers (EOM), ethylene butene copolymers (EBM), ethylene octene terpolymers (EODM), ethylene butene terpolymers (EBDM), ethylene vinylacetate elastomers (EVM), ethylene methylacrylate (EAM), produced by a variety of solution or emulsion polymerization processes and anionic, cationic, or free-radical initiation to produce random, or block comonomer sequence distributions and low to high vinyl microstructure of the diene portion. Functionalized versions of these elastomers may also be included in the elastomeric compositions combined with the pre-treated fabrics or fibers according to the disclosed methods and compositions. Other suitable elastomers that may be utilized include for example polyurethane elastomers (including as well polyurethane/urea elastomers) (PU), polychloroprene rubber (CR), acrylonitrile butadiene rubber (NBR), hydrogenated NBR(H-NBR), alkylated chlorosulfonated polyethylene (ACSM), epichlorohydrin, ethylene alpha olefin elastomers, and silicone rubber, or a combination of any two or more of the foregoing.

Fabrics or fibers made from various types of materials and combinations thereof may be pre-treated using the compositions and processes according to the disclosed methods and compositions. The fabrics may be woven or non-woven. The fibers may be provided in various forms, such as cord or yarn, for example. The fabrics or fibers may include synthetic and/or natural materials, such as cellulose, polyester, rayon, nylon, vinyl, polyamide, polyketone, poly-p-phenylene-benzobisoxazole ("PBO"), aramid, and carbon fibers. Examples of polyester fibers include polyethylene terephthalate ("PET") and polyethylene naphthalate ("PEN"). Examples of aramid (aromatic polyamide) fibers include meta-aramid, para-aramid, and aramid copolymers. Examples of polyamides include nylon 6, nylon 66, and nylon 46. Examples of polyketones include polyetherketones (PEK), polyetheretherketones (PEEK), polyaryletherketones (PAEK), and polymers in which ethylene is copolymerized with carbon monoxide and poly (1-oxotrimethylene). The fabric or fiber may be of any desired construction, meaning the number, yarn count, twist level or direction of the yarn or yarns, ply or plies, making up the fabric or fibers are not limited.

The fiber treatment compositions according to the various embodiments of the disclosed methods and compositions comprise a modified blocked polymer having a polymeric chain and at least one end terminated with an Isocyanate, wherein the isocyanate is blocked with a blocking agent. The polymeric chain having at least one end terminated with an isocyanate may be the reaction product of a hydroxyl-terminated polymer with a diisocyanate compound. The hydroxyl-terminated polymer may be a diol having an OH functionality of at least 1.8, alternatively at least 2.4, such that at least two terminal ends of the hydroxyl-terminated polymer react with a diisocyanate compound. Optionally, one or more chain extenders may also be reacted with the hydroxyl-terminated polymer and the Isocyanate to control the molecular weight of the functionalized polymer. Exemplary chain-extending diols may include monomeric diols, polymeric diols, and combinations thereof. The one or more monomeric polyols that may be included in the disclosed compositions include, but are not limited to, 1,4-butanediol, 1,6-hexanediol, ethylene glycol, 2-ethyl-1,3-hexanediol (EHD), 2-butyl-2-ethyl-1,3-propanediol (BEPG), 2,2,4-trimethyl-1,3-pentanediol (TMPD), 2,4-deithyl-1,5-pentanediol (PD-9), hydroquinone dihydroxyethyl ether (HQEE), diethylene glycol, propylene glycol, trimethylolpropane, and glycerol. The one or more polymeric polyols that may be included in the disclosed compositions include, but are not limited to, polyester diols, polyether diols, polyetherester diols, polyesterether diols, polythioester dithiols, polycarbonate diols, polyacetal diols, and polycaprolactone polyols. Examples of hydroxyl-terminated polymers include, but are not limited to, hydroxyl-terminated homopolymers or copolymers of dienes. Examples of dienes include, but are not limited to, butadiene, isoprene, and farnesene. Examples of co-monomers include, but are not limited to, vinyl aromatic monomers (e.g. vinyl toluenes, styrene, and alpha methyl styrene), ethylene, propylene, and combinations thereof. It is preferred that the hydroxyl-terminated polydienes have a 1-2 vinyl content less than 70%, alternatively less than 50%, and alternatively less than 30%, based on the number average molecular weight of the polydiene. It is further preferred that the hydroxyl-terminated polydienes are of relatively low molecular weight and viscosity. The hydroxyl-terminated polydienes may have a molecular weight of about 1,000 to 15,000 g/mol, alternatively about 1,500 to 10,000 g/mol, and alternatively about 2,000 to 5,000 g/mol, based on the number average molecular weight of the polydiene. The hydroxyl-terminated polydienes may have a viscosity less than 100 Pa·s @ 23° C., alternatively less than 50 Pa·s @ 23° C., and alternatively less than 25 Pa·s @ 23° C.

Preferred hydroxyl-terminated polymers are low molecular weight, low viscosity liquid resins of hydroxyl terminated polybutadiene, such as Poly Bd® R-45HTLO resin manufactured by TOTAL Petrochemical and Refining Inc., USA of Houston, Tex.

According to various embodiments of the disclosed methods and compositions, the terminal hydroxyl groups of the polymers are reacted with an isocyanate containing compound, such as diisocyanates, tri-isocyanates, poly-isocyanates, or other suitable reactive isocyanate forms. Either aromatic or aliphatic diisocyanates may be used to react with the hydroxyl terminated polymers. Exemplary diisocyanates include, but are not limited to, isophoronediisocyanate ("IPDI"), diphenylmethane diisocyanate ("MDI"), modified or polymeric MDI, toluene diisocyanate ("TDI"), paraphenylene diisocyanate ("PPDI"), and the like, including any of the various forms or derivatives thereof, IPDI being most preferred. Mixtures of diisocyanates may also be used, including mixed isomers.

The polymeric chain having at least one end terminated with an isocyanate is reacted with a blocking agent to block the isocyanate group. Therefore, as used herein throughout the specification and the claims, "a blocked isocyanate group" means that the isocyanate groups on the terminal ends of the polymeric chain are reversibly reacted with a blocking agent to temporarily eliminate the presence of the isocyanate group. For example, the blocking agent may be an oxime that upon reacting with the Isocyanate groups forms urethane bonds. The polymer may be "deblocked" with the application of heat, so that the urethane bonds are broken and return to a cyanate group. An exemplary reaction mechanism may proceed according to Formula 1 below in which the reaction product on the right side of the equation is considered a polymeric chain having a "blocked" isocyanate:

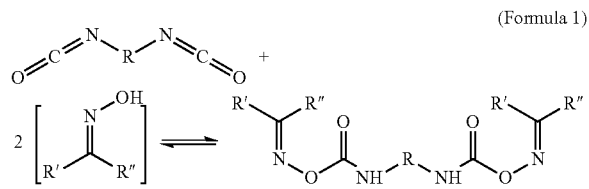

(Formula 1)

wherein R comprises a polymeric chain and R' and R" are independently an aromatic or aliphatic group or alternatively, R' and R" may together form a cyclic group.

The compositions according to the disclosed herein may be provided in the form of an aqueous emulsion. Blocking the isocyanate groups with blocking agent prevents the isocyanate groups from prematurely reacting with water prior to application of the emulsion to a fabric or fiber. The blocking agent may be selected, such that a temperature in excess of 100° C. Is needed to deblock the blocked isocyanate groups. This will allow the removal of moisture from the emulsion applied to a treated fabric or fiber. After the moisture is removed, increasing the temperature of a treated fabric or fiber will deblock the Isocyanate groups which may then cross-link and/or bond to the treated fabric or fiber. The blocking agent desirably deblocks at a temperature from about 110° C. to 140° C. Examples of blocking agents include, but are not limited to caprolactams, phenols, oximes, pyrazoles, malonates, and combinations thereof. The blocking agents may be mono-functionalized or di-functionalized. Specific examples of may include cyclohexanone oxime, hexanone oxime, e-caprolactam, diethylmalonate, and 3,5 dimethylpyrazol. A useful blocking agent is cyclohexanone oxime.

As mentioned above, the polymeric chain terminated with an isocyanate group blocked with an oxime is provided in the form of an aqueous emulsion. To facilitate the formation of the emulsion, the polymeric chain may be further functionalized with one or more acid groups, such that the resulting acid-functionalized polymeric chain may be emulsified with water and optionally, a base. For example, in one embodiment, a compound containing at least two hydroxyl groups and at least one acid group may be reacted with the diisocyanates and hydroxyl-terminated polymer, so that one or more acid groups may be attached to the terminal end of the polymer chain between two urethane bonds. Examples of acids that may be used to functionalize the polymeric chains according to the disclosed methods and compositions include, but are not limited to dimethylolpropionic acid, 2,2-Bis(hydroxymethyl)butyric acid, and combinations thereof. A useful acid is dimethylolpropionic acid. Providing an acid-functionalized polymer chain having blocked-isocyanate terminal groups may reduce or eliminate the need for surfactants to form the aqueous emulsions according to the disclosed methods and compositions. The base included in the emulsion composition should be selected, such that the base will avoid unwanted side reactions with the diisocyanate. Examples of useful bases include, but are not limited to tertiary amines, such as triethylamine, tripropylamine, and combinations thereof. The emulsion compositions may include other components, such as anti-oxidants, catalysts, or other additives and ingredients for processing, shelf-life, and stability, for example. One or more various solvents may also be incorporated into the emulsion composition to promote penetration into and treatment of the fabrics or fibers.

Prior to application to fabric or fiber, the aqueous emulsions of the disclosed methods and compositions may be combined with one or more latexes to form treatment compositions, i.e. stable dispersions or emulsions of one or more natural or synthetic elastomers, such as natural rubber, vinyl pyridine (VP), and styrene-butadiene rubber (SBR), for example. The natural or synthetic elastomers may be the same or different than the elastomeric material in which the fabrics or fibers are to be embedded. Any method known by those of skill in the art may be used to coat the fabrics or fibers with the disclosed treatment compositions. Spraying, coating, or dipping methods, for example, may be used to ensure that the fabrics or fibers are evenly treated with sufficient volume of the treatment composition to facilitate crosslinking and bonding of the deblocked-isocyanate terminated polymers, as well as curing of the elastomeric products, whether sulfur cured or peroxide cured. The treated fabrics or fibers may comprise 1 to 60 wt. %, 5 to 40 wt. %, or 10 to 20 wt. %, for example, of the blocked isocyanate group terminated polymers and one or more latexes based upon the weight of the treated fabric or fiber after application and drying of the treatment composition, but before curing in the elastomeric product.

The solid content of the aqueous emulsions, the solid content of the latex composition, as well as the ratio of blocked isocyanate-terminated polymer emulsion to latex emulsion may be varied depending on various factors, such as the desired physical properties of the treated fabric or fiber, the type of fabric or fiber being treated, as well as the type of application method used to apply the treatment compositions to the fabric or fiber. For example, a spray method may require a treatment composition of lower viscosity than a dipping method. As would be understood by one of skill in the art, the molecular weight of the blocked isocyanate-terminated polymer, as well as the latex elastomers would also effect the viscosity of the formulations according to the disclosed methods and compositions. In yet another example, it may be preferable to formulate a treatment composition, such that the fabric or fiber after having been treated and dried, has a surface with a desired degree of tack. For power transmission belts, a degree of tack is often desirable, but the treated fabric or fiber should be able to release from itself when taken off a spool of treated fabric or fiber, for example. The solid content of the aqueous emulsions containing the blocked-isocyanate terminated polymers may have a solids content of 1 to 50%, alternatively 5 to 40%, and alternatively 10 to 30%, based on the total weight of the emulsion. The weight ratio range of blocked-isocyanate terminated polymer to latex elastomer in the treatment formulations according to the disclosed methods and compositions may be 1:3 to 3:1, alternatively 1:2 to 2:1. Process parameters for applying the treatment solutions according to the disclosed methods and compositions, such as drying temperature, dipping rate, use of wipers, and the like, may also be selected to affect various end properties of the treated fabric or fiber.

Crosslinking and bonding of the deblocked isocyanated-terminated polymers of the disclosed methods and compositions may occur from the reaction between any residual moisture present in the coating composition on the treated fabric or fiber and the isocyanate groups to form an unstable carbamic acid, which then gives off carbon dioxide to form a reactive amine. The amine may then react with another isocyanate to form a urea linkage. The isocyanate groups may also react with any hydroxyl-groups present in the natural or synthetic material making up the fabric or fiber to form a urethane bond. Three or more isocyanate groups may also react with themselves to form a tri-isocyanurate ring structure or polyisocyanurate. Therefore, the terminal isocyanate groups provide for the bonding and encapsulation of the coating composition to the fiber cord. The polymeric chain should be compatible with the latex and elastomeric material of the elastomeric product, such that the polymeric chain will cure with the elastomers by means of either sulfur or free-radical curatives Treated fabric or fiber of the disclosed methods and compositions may be useful in variety of elastomeric products, such as tires, air springs, flexible couplings, power transmission belts, conveyor belts, fluid routing hose, and other composite rubber articles subject to dynamic loads as well as textile-reinforced rubber articles in general. For example, the use of fabric or fiber in air springs is described in U.S. Pat. No. 4,954,194, the use of fabric or fiber in flexible couplings is described in U.S. Pat. No. 6,283,868, and the use of fabric or fiber for carcass and/or tread reinforcement in tires is described in U.S. Pat. No. 3,616,832. The contents of all of the previously referenced publications are incorporated herein by reference. As would be understood by those of skill in the art, the orientation of the treated fabric or fiber affects the tensile or load-carrying ability of the fabric or fiber embedded in the elastomeric product. For example, fiber cord may be included in power transmission belts or tires by aligning the fiber cord along the length of the belt or tire rather than a direction that is transverse to the length. The treated fabric or fiber may be at least partially embedded in the elastomeric material of the power transmission belt or tire.

Additional components that may be incorporated in the elastomeric products include conventional rubber compounding ingredients including fillers, plasticizers, stabilizers, vulcanization agents/curatives, and accelerators, in amounts conventionally employed. For example, examples of reinforcing fillers include pyrogenic silica fillers and precipitated finely-divided silicas typically employed for rubber compounding. The silica filler, however, may be of the type obtained by precipitation from a soluble silicate, such as sodium silicate. For example, silica fillers produced according to the method described in U.S. Pat. No. 2,940,830 may be used. These precipitated, hydrated silica pigments have a $SiO_2$ content of at least 50% and usually greater than 80% by weight on an anhydrous basis. The silica filler may have an ultimate particle size in the range of from about 50 to 10,000 angstroms, between 50 and 400, or between 100 and 300 angstroms, for example. The silica may have an average ultimate particle size in a range of about 0.01 to 0.05 microns as determined by electron microscope, although the silica particles may even be smaller in size. The BET surface area of the filler as measured using nitrogen gas may be in the range of 40 to 600 square meters per gram, or 50 to 300 square meters per gram, for example. The BET method of measuring surface area is described in the Journal of the American Chemical Society, Vol. 60, page 304 (1930). The silica also has a dibutyl (DBP) absorption value in a range of about 200 to about 400, or a range of from about 220 to 300, for example.

Various commercially available silicas and carbon black may be used as reinforcing fillers. For example, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160-170 and by a DBP value of about 250-290 and by having a substantially spherical shape. Representative examples of carbon blacks include N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991.

Representative reinforcing fillers may be included in rubber compositions according to various embodiments of the invention in amounts ranging from about 5 to 100 parts, or from about 10 to 50 parts, for example, by weight based on 100 parts by weight of total rubber (phr).

In compounding a rubber composition containing a silica filler, one generally uses a coupling agent. Such coupling agents, for example, may be premixed or pre-reacted with the filler or added to the rubber mix during the rubber/filler processing or mixing stage. If the coupling agent and filler are added separately to the rubber mix during the rubber/filler mixing or processing stage, it is considered that the coupling agent then combines in situ with the filler. Any coupling agents known to those of skill in the art may be employed in elastomeric products according to the disclosed methods and compositions. Coupling agents are generally composed of a silane which has a constituent silane component (i.e. moiety) capable of reacting with the silica surface and, also, a constituent component capable of reacting with the rubber, particularly a sulfur-vulcanizable rubber which contains carbon-to-carbon double bonds, or unsaturation. In this manner, the coupler may act as a connecting bridge between the silica and the rubber and thereby enhance the rubber reinforcement aspect of the silica.

The silane of the coupling agent may form a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage. However, some degree of combination or bonding may occur between the rubber-reactive component of the coupler and the rubber during an initial rubber/silica/coupler mixing stage prior to a subsequent vulcanization stage.

The rubber-reactive group component of the coupling agent may be, for example, one or more of groups such as mercapto, amino, vinyl, epoxy, and sulfur groups. Examples of coupling agents include, but are not limited to, a bifunctional sulfur containing organosilane such as, for example, bis-(3-triethoxysilylpropyl)tetrasulfide, bis-(3-trimethoxysilylpropyl) tetrasulfide and bis(3-triethoxysilylpropyl) tetrasulfide grafted silica from DeGussa, A. G. The amount of silica coupling agent which may be used may range from about 0.5 to about 8.5 parts, or about 1.0 to 5.0 parts, for example, by weight per 100 parts by weight of total rubber used.

The rubber composition may also contain conventional additives in addition to reinforcing fillers, including other fillers, peptizing agents, pigments, stearic acid, accelerators, sulfur or peroxide vulcanizing agents, antiozonants, antioxidants, processing oils, activators, plasticizers, waxes, prevulcanization inhibitors, extender oils and the like.

Examples of sulfur vulcanizing agents include, but are not limited to, elemental sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent, but generally range from about 0.1 phr to about 5 phr with a range of from about 0.5 phr to about 2 phr being preferred.

The peroxide vulcanizing agents may be at least one of dicumyl, peroxide, di-t-butyl peroxide, t-butylcumyl peroxide, benzoyl peroxide; 1,3-bis(t-butylperoxyisopropyl) benzene, 2,5-dimethyl-2,5-di(t-butylperoxy)hexene-3,2,5-dimethyl-2,5-(benzoylperoxy) hexane, 2,5-dimethyl-2,5-mono (t-butylperoxy)hexane, and the like. These organic peroxides may be used alone or in combination. Vulcanizing co-agents may be added to enhance the degree of vulcanization, to avoid tack wear problems. The vulcanization co-agents may be at least one of TIAC, TAC, 1,2-polybutadiene, metallic salts of unsaturated carboxylic acids, oximes, guanidine, trimethylolpropane trimethacrylate, ethylene glycol dimethacrylate, N—N'-m-phenylene bismaleimide, sulfur, and the like.

Examples of antidegradants that may be in a rubber composition include, but are not limited to, monophenols, bisphenols, thiobisphenols, polyphenols, hydroquinone derivatives, phosphites, phosphate blends, thioesters, naphthylamines, diphenol amines as well as other diaryl amine derivatives, para-phenylene diamines, quinolines and blended amines. Antidegradants are generally used in an amount ranging from about 0.1 phr to about 10 phr with a range of from about 2 to 6 phr being preferred.

Examples of a peptizing agent include, but are not limited to, pentachlorophenol which may be used in an amount ranging from about 0.1 phr to 0.4 phr with a range of from about 0.2 to 0.3 phr being preferred.

Examples of processing oils include, but are not limited to, aliphatic-naphthenic aromatic resins, polyethylene glycol, petroleum oils, ester plasticizers, vulcanized vegetable oils, pine tar, phenolic resins, petroleum resins, polymeric esters and rosins. A processing oils may be used in an amount ranging from about 0 to about 50 phr with a range of from about 5 to 35 phr being preferred.

An example of an activator includes, but is not limited to, the combination of zinc oxide and stearic acid. Together, activators may be used in an amount ranging from about 1 to 10 phr, such as a range of from about 4 to 8 phr.

Examples of accelerators include, but are not limited to, amines, guanidines, thioureas, thiols, thiurams, disulfides, thiazoles, sulfenamides, dithiocarbamates and xanthates. In cases where only a primary accelerator is used, the amounts used may range from about 0.5 to 2.5 phr. In cases where combinations of two or more accelerators are used, the primary accelerator is generally may be used in amounts ranging from 0.5 to 2.0 phr and a secondary accelerator may be used in amounts ranging from about 0.1 to 0.5 phr. Combinations of accelerators have been known to produce a synergistic effect, the primary accelerator is a sulfenamide.

If a secondary accelerator is used, it is a guanidine, dithiocarbamate, or thiuram compound.

EXAMPLES

Embodiments of the invention are further illustrated by reference to the following non-limiting examples.

Synthesis of Blocked Isocyanate-Terminated Polymer Aqueous Emulsion

A polyol in the form of a hydroxylated polybutadiene (Poly Bd® R-45HTLO manufactured by TOTAL Petrochemicals and Refining, Inc. of Houston, Tex.) was combined with dimethylolpropionic acid (DMPA), triethylamine (NeT3), and isophoronediisocyanate (IPDI) in the following amounts:

TABLE 1

| Material | Amount (g) |
|---|---|
| Poly bd ® R-45HTLO | 284.3 |
| Dimethylolpropionic acid (DMPA) | 14.8 |
| Triethylamine (NeT3) | 11.4 |
| Isophoronediisocyanate (IPDI) | 70.2 |

The materials were combined in a solvent at room temperature (methyl ethyl ketone) to form a dispersion, such that the final solid content of the dispersion was 40%. The temperature of the dispersion was raised to 80° C. and stirred for two hours. The temperature was maintained while an excess of cyclohexanone oxime was added (19.3 g) to ensure that most if not all of the terminal isocyanate groups were blocked. Following addition of the oxime, the emulsion was prepared by adding water and then stripping the solvent, such that the final aqueous emulsion had a solids content of 40% and exhibited a viscosity less than 100 mPa·s @23° C.

Fiber Cord Treatment

An aqueous dip formulation was prepared by combining the aqueous emulsion and a vinyl pyridine latex in water, such that the aqueous dip solution contained 8% of the blocked isocyanate-terminated polymer and 8% of vinyl pyridine based on the total weight of the dip solution. A low stirring rate was needed to homogenize the components of the aqueous dip formulation due to the good compatibility between the aqueous emulsion and the latex, as well as the relatively low viscosity of the aqueous emulsion. The resulting formulation was stable, and no maturation or activation steps of the aqueous emulsion were necessary prior to combining it with the latex.

Textiles made from various fibers were dipped in the aqueous dip formulation for approximately five seconds and dried from about 2 to 3 minutes at 180° C. The solid pickup of the treated textile was approximately 15 wt % based on the total weight the treated textile after drying. The treated textiles were then incorporated into a layered structure with NR rubber to form samples, as illustrated in FIG. 1, for adhesive testing.

The layered structure was prepared by loading a 2-mm thick flat mold with a first layer 10 of uncured NR rubber (0.8-1 mm) upon which a second layer 12 of the treated textile was placed. A sheet of silicone paper 14 was then applied over a portion "P" of the length "L" of the layered structure to provide an unbonded section of the sample. A third layer 16 of uncured NR rubber (0.8-1 mm) was loaded on top of the second layer 12 and finally a fourth layer 18 of treated textile. The layered structure was cured in the mold at a temperature of about 160° C. Once cured, the silicone paper 14 was removed to provide a sample in which the area occupied by the silicone paper 14 between the second layer 12 and third layer 16 was unbonded. A T-peel test was performed on the samples according to ASTM D1876 to evaluate adhesive strength. The results are provided in Table 2.

TABLE 2

| | Type of Fiber | | | |
|---|---|---|---|---|
| | Rayon | PE | Nylon | Aramid |
| T-Peel adhesion (N/cm) | 95 | 90 | 43 | 11 |
| Type of failure at interface | Cohesive in rubber | Cohesive in rubber | Textile rupture | Adhesive |

Comparative Example

The synthesis procedure for the blocked isocyanate-terminated polymer aqueous emulsion was repeated except that two different hydroxylated polybutadiene polymers were used. A similar dipping formulation was prepared using the resulting aqueous emulsions and a sample of rayon fiber treated to perform a similar T-peel test.

TABLE 3

| Polyol polybutadiene | PolyBdR45HT LO | Krasol LBHP2000 | Krasol HLBHP2000 |
|---|---|---|---|
| 1-2 Vinyl content | 28% | 65% | 0% |
| 1-4 unsaturation | 72% | 35% | 0% |
| T-Peel adhesion | 95 N/cm | 28 N/cm | 12 N/cm |
| Type of failure | Cohesive in rubber | Adhesive | Adhesive |

While preferred embodiments of the Invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. A rubber product comprising an elastomer material and a treated material, wherein the treated material comprises:
   at least one of a fabric and a fiber which has been treated with a fiber treatment formulation consisting essentially of:
   a modified polymer comprising a diene-based polymeric chain and at least one end terminated with a blocked isocyanate group, wherein the blocked isocyanate group is the reaction product of an isocyanate and a blocking agent and deblocks at temperatures of at least 100° C.;
   one or more latexes of one or more natural or synthetic elastomers; and
   optionally, at least one additional component selected from the group consisting of bases, solvents, antioxidants, catalysts, processing additives, shelf-life additives, and stability additives;
   wherein resorcinol and formaldehyde are not employed in treating the at least one of a fabric and a fiber.

2. The rubber product of claim 1, wherein the diene-based polymeric chain is a copolymer of at least one diene and at least one vinyl aromatic monomer.

3. The rubber product of claim 1, wherein the diene-based polymeric chain is polybutadiene.

4. The rubber product of claim 1 wherein the modified polymer further comprises one or more acid functional groups.

5. The rubber product of claim 1 wherein the modified polymer has two or more ends terminated with blocked isocyanate groups.

6. The rubber product of claim 1 wherein the modified polymer has a number average molecular weight of 1000 to 15000.

7. The rubber product of claim 1 wherein the fiber treatment formulation contains a base.

8. The rubber product of claim 7, wherein the base comprises at least one tertiary amine.

9. The rubber product of claim 1 wherein the modified polymer is prepared by a method comprising:
   combining a hydroxyl-terminated polymer, an acid, a base, and a diisocyanate in an organic solvent to form an isocyanate-terminated polymer; and
   adding a blocking agent to the isocyanate-terminated polymer to form the modified polymer.

10. The rubber product of claim 9, wherein the acid comprises at least two hydroxyl groups.

11. The rubber product of claim 9, wherein the hydroxyl-terminated polymer is a polyol of polybutadiene.

12. The rubber product of claim 9, wherein the diisocyanate is isophorone diisocyanate.

13. The rubber product of claim 9, wherein the blocking agent is cyclohexanone oxime.

14. The rubber product of claim 1, wherein the one or more latexes are selected from the group consisting of vinyl-pyridine latex, styrene-butadiene-rubber latex, carboxylated styrene butadiene rubber latex, and mixtures thereof.

15. The rubber product of claim 1, wherein the at least one of fabric and fiber is selected from the group consisting of cellulose, nylon, polyethylene, polyester, rayon, nylon, vinyl, polyamide, polyketone, poly-p-phenylene-benzobisoxazole ("PBO"), aramid, carbon fibers, and combinations thereof.

16. The rubber product of claim 1, wherein the blocking agent is selected from the group consisting of caprolactams, phenols, oximes, pyrazoles, malonates, and combinations thereof.

17. The rubber product of claim 1, wherein the modified polymer and one or more latexes comprise 1 to 60 wt % of the treated material.

18. The rubber product of claim 1 provided in the form of at least one of a tire, air spring, flexible coupling, power transmission belt, conveyor belt, or fluid routing hose.

* * * * *